US008108510B2

(12) United States Patent
Nelson et al.

(10) Patent No.: US 8,108,510 B2
(45) Date of Patent: Jan. 31, 2012

(54) METHOD FOR IMPLEMENTING TOPN MEASUREMENTS IN OPERATIONS SUPPORT SYSTEMS

(75) Inventors: Ellen Maureen Nelson, Laporte, CO (US); Bruce Votipka, Fort Collins, CO (US); Craig A. Ehike, Fort Collins, CO (US); Scott S. Neal, Fort Collins, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1378 days.

(21) Appl. No.: 11/045,819

(22) Filed: Jan. 28, 2005

(65) Prior Publication Data

US 2006/0190578 A1    Aug. 24, 2006

(51) Int. Cl.
*G06F 15/173* (2006.01)
(52) U.S. Cl. ....................................... 709/224
(58) Field of Classification Search .................. 709/202, 709/203, 223, 224, 219; 715/772, 215, 733–736; 707/10, 104.1, 752, 755, 805; 703/20; 702/80, 702/81, 187, 188
See application file for complete search history.

(56) References Cited

U.S. PATENT DOCUMENTS

| 5,684,945 | A  | * | 11/1997 | Chen et al. ........................ 714/20 |
| 6,003,079 | A  | * | 12/1999 | Friedrich et al. .............. 709/224 |
| 6,336,138 | B1 |   | 1/2002  | Caswell et al. |
| 6,363,421 | B2 | * | 3/2002  | Barker et al. .................. 709/223 |
| 6,370,572 | B1 | * | 4/2002  | Lindskog et al. ............. 709/223 |
| 6,502,131 | B1 | * | 12/2002 | Vaid et al. ..................... 709/224 |
| 6,609,083 | B2 | * | 8/2003  | Enck et al. .................... 702/186 |
| 6,609,091 | B1 | * | 8/2003  | Budzinski ........................ 704/9 |
| 6,643,646 | B2 | * | 11/2003 | Su et al. ............................ 1/1 |
| 6,681,232 | B1 | * | 1/2004  | Sistanizadeh et al. ..... 707/104.1 |
| 6,721,747 | B2 | * | 4/2004  | Lipkin .......................... 709/209 |
| 6,748,440 | B1 | * | 6/2004  | Lisitsa et al. .................. 709/231 |
| 6,792,393 | B1 | * | 9/2004  | Farel et al. .................... 702/186 |
| 6,840,442 | B2 | * | 1/2005  | Swaminathan et al. ....... 235/380 |
| 6,983,227 | B1 | * | 1/2006  | Thalhammer-Reyero ........ 703/2 |
| 6,985,901 | B1 | * | 1/2006  | Sachse et al. ...................... 1/1 |

(Continued)

FOREIGN PATENT DOCUMENTS

WO    WO 00/67507    11/2000

OTHER PUBLICATIONS

Wade, V.P. and Richardson, T. "Workflow: A Unifying Technology for Operational Support Systems," IEEE/IFIP Network Operations and Management Symposium (NOMS), Apr. 14, 2000, pp. 231-246.*

(Continued)

*Primary Examiner* — Andrew Caldwell
*Assistant Examiner* — Melvin H Pollack
(74) *Attorney, Agent, or Firm* — Matthew A. Pequignot; Pequignot + Myers LLC

(57) ABSTRACT

In an OSS, storing a plurality, typically less than all, of name-value pairs from a sample space and calculating a "representative" value based on values in the entire sample space. Optionally, a "remainder" value can be generated based on name-value pairs in the sample space that were not stored as part of the plurality of name-value pairs. Displays may be generated based on the top "M" name-value pairs, with "M" typically being set by the user at some number less than "M."

19 Claims, 7 Drawing Sheets

U.S. PATENT DOCUMENTS

| | | | |
|---|---|---|---|
| 7,013,084 B2 * | 3/2006 | Battou et al. | 398/45 |
| 7,035,766 B1 * | 4/2006 | Farel et al. | 702/183 |
| 7,054,866 B2 * | 5/2006 | Trivedi | 707/10 |
| 7,065,588 B2 * | 6/2006 | Konda et al. | 709/246 |
| 7,113,934 B2 * | 9/2006 | Levesque et al. | 1/1 |
| 7,123,592 B2 * | 10/2006 | Geile et al. | 370/307 |
| 7,136,867 B1 * | 11/2006 | Chatterjee et al. | 707/102 |
| 7,143,008 B2 * | 11/2006 | Ochi et al. | 702/186 |
| 7,143,153 B1 * | 11/2006 | Black et al. | 709/223 |
| 7,145,906 B2 * | 12/2006 | Fenner | 370/392 |
| 7,146,408 B1 * | 12/2006 | Crater et al. | 709/219 |
| 7,185,075 B1 * | 2/2007 | Mishra et al. | 709/223 |
| 7,203,962 B1 * | 4/2007 | Moran | 726/23 |
| 7,216,350 B2 * | 5/2007 | Martin et al. | 719/315 |
| 7,222,182 B2 * | 5/2007 | Lisitsa et al. | 709/231 |
| 7,254,109 B2 * | 8/2007 | Verma et al. | 370/217 |
| 7,299,277 B1 * | 11/2007 | Moran et al. | 709/224 |
| 7,313,575 B2 * | 12/2007 | Carr et al. | 707/104.1 |
| 7,319,673 B1 * | 1/2008 | Briscoe et al. | 370/252 |
| 7,333,977 B2 * | 2/2008 | Swaminathan et al. | 707/3 |
| 7,366,989 B2 * | 4/2008 | Naik et al. | 715/736 |
| 7,428,723 B2 * | 9/2008 | Greene et al. | 717/103 |
| 7,496,677 B2 * | 2/2009 | Lisitsa et al. | 709/231 |
| 7,526,322 B2 * | 4/2009 | Whistler | 455/566 |
| 7,529,347 B2 * | 5/2009 | Warner et al. | 379/1.03 |
| 7,557,941 B2 * | 7/2009 | Walmsley | 358/1.14 |
| 7,633,942 B2 * | 12/2009 | Bearden et al. | 370/392 |
| 7,663,502 B2 * | 2/2010 | Breed | 340/825.72 |
| 7,676,390 B2 * | 3/2010 | Senturk et al. | 705/7 |
| 7,716,077 B1 * | 5/2010 | Mikurak | 705/8 |
| 7,802,264 B2 * | 9/2010 | Robertson et al. | 709/215 |
| 7,817,767 B2 * | 10/2010 | Tell et al. | 375/376 |
| 2002/0159641 A1 * | 10/2002 | Whitney et al. | 382/219 |
| 2003/0133552 A1 * | 7/2003 | Pillai et al. | 379/114.2 |
| 2003/0144868 A1 * | 7/2003 | MacIntyre et al. | 705/1 |
| 2004/0107277 A1 * | 6/2004 | Levesque et al. | 709/223 |
| 2004/0143655 A1 * | 7/2004 | Narad et al. | 709/223 |
| 2004/0153382 A1 * | 8/2004 | Boccuzzi et al. | 705/34 |
| 2004/0210582 A1 * | 10/2004 | Chatterjee et al. | 707/9 |
| 2004/0221202 A1 | 11/2004 | Nye | |
| 2005/0027858 A1 * | 2/2005 | Sloth et al. | 709/224 |
| 2005/0201342 A1 * | 9/2005 | Wilkinson et al. | 370/338 |
| 2005/0259571 A1 * | 11/2005 | Battou | 370/217 |
| 2006/0109979 A1 * | 5/2006 | Afzal et al. | 379/399.01 |
| 2007/0067435 A1 * | 3/2007 | Landis et al. | 709/224 |

OTHER PUBLICATIONS

Johnsen, Svein Tore et al. "e-Commerce Impacts on Service and Network Operations and Management," EURESCOM, Oct. 2002, pp. 1-28.*

Furley, N. "The BT Operational Support Systems Architecutre," BT Technology Journal: Computer Science, vol. 15, No. 1, Jan. 1997, pp. 13-21.*

Awduche, D. and Rekhter, Y. "Multiprotocol Lambda Switching: Combining MPLS Traffic Engineering Control with Optical Crossconnects," IEEE Communications Magazine, vol. 39, Issue 3, Mar. 2001, pp. 111-116.*

United Kingdom Inetllectual Property Office, Examination Report under Section 18(3) dated Sep. 29, 2009.

* cited by examiner

METHOD FOR IMPLEMENTING TOPN MEASUREMENTS IN OPERATIONS SUPPORT SYSTEMS

BACKGROUND OF THE INVENTION

The term Operations Support System (OSS) generally refers to a system (or systems) that performs management, inventory, engineering, planning, and repair functions for communications service providers and their networks. Originally, OSS's were mainframe-based, stand-alone systems designed to support telephone company staff members in their daily jobs by automating manual processes, making operation of the network more error-free and efficient. Today's OSS's manage an increasingly complex set of products and services in a dynamic, competitive marketplace helping service providers maximize their return on investment (ROI) in one of their key assets—information. The ultimate goal of OSS's is to enable service providers to reduce costs, provide superior customer service, and accelerate their time to market for new products and services.

OSS's, such as the AGILENT QoS Manager, model the topography of the system under test and collect a variety of data describing the state of and activity on the system under test. For example, data can be gathered from individual applications, servers, network links and networking equipment. In general, the data comprises a stream of scalar values. OSS's receive and store the streams of values. The values are used to produce graphics describing the operation of the system under test. Such graphics may include graphs and charts, from which a trained user may assess end-to-end service performance. For example, displays may be formulated that provide an indication of whether the service provider is adhering to service level agreements with subscribers.

One type of display that has gained in popularity is TopN. TopN refers to a selected number "M" (n typically being a small value such as 5 or 10) of measurements selected from a sample space, wherein each selected measurement is in the top or bottom "M" of ordered measurements in the sample space. The sample space generally comprises all of the measurements taken over a predetermined period of time One example of a TopN measurement is the Top 10 response times for a particular web server. In this case the Top 10 responses are typically the 10 slowest responses, however it may represent the 10 quickest responses.

Current use of TopN measurements typically consists of the static presentation of the individual measurements within the TopN set of measurements. Because of the nature of the measurements, TopN measurements are not subject to the same analysis methods as other measurements, including such traditional OSS strengths as baselining and thresholding. One reason is that existing OSSs were programmed to process one scalar value at a time and are not adept at processing a chunk of measurements as presented by a TopN measurement.

Accordingly, the present inventors have recognized a need for new methods for handling TopN measurements that facilitates additional uses for TopN measurements within the framework of OSSs.

BRIEF DESCRIPTION OF THE DRAWINGS

An understanding of some embodiments the present invention can be gained from the following detailed description, taken in conjunction with the accompanying drawings of which.

DETAILED DESCRIPTION

Figure 1:
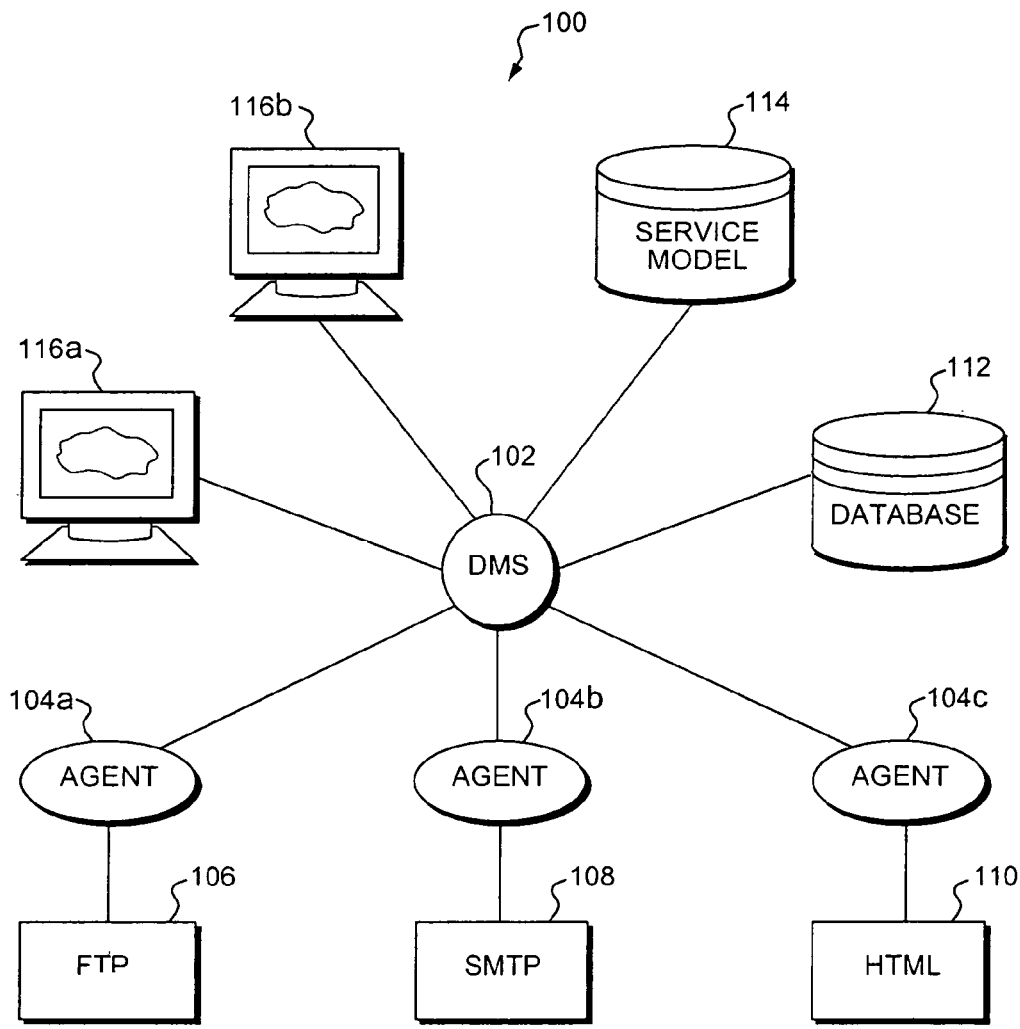
FIG. 1 is a block diagram of an OSS system.

Reference will now be made in detail to embodiments of the present invention, some of which are illustrated in the accompanying drawings, wherein like reference numerals refer to like elements throughout. The detailed description which follows presents methods that may be embodied by routines and symbolic representations of operations of data bits within a computer readable medium, associated processors, general purpose personal computers and the like. These descriptions and representations are the means used by those skilled in the art effectively convey the substance of their work to others skilled in the art.

A method is here, and generally, conceived to be a sequence of steps or actions leading to a desired result, and as such, encompasses such terms of art as "routine," "program," "objects," "functions," "subroutines," and "procedures." The methods recited herein may operate on a general purpose computer or other network device selectively activated or reconfigured by a routine stored in the computer and interface with the necessary signal processing capabilities. More to the point, the methods presented herein are not inherently related to any particular device; rather, various devices may be used to implement the claimed methods. Machines useful for implementation of the described embodiments include those manufactured by such companies as AGILENT TECHNOLOGIES, INC. and HEWLETT PACKARD, as well as other manufacturers of computer and network equipment.

With respect to the software described herein, those of ordinary skill in the art will recognize that there exist a variety of platforms and languages for creating software for performing the methods outlined herein. Embodiments of the present invention can be implemented using any of a number of varieties of JAVA, however, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a microprocessor, but can also be implemented in other types of processors. For example, the methods could be implemented with HDL (Hardware Design Language) in an ASIC (application specific integrated circuits).

In at least one embodiment of the present invention, a TopN data structure is formed by: selecting a number "M" of 'name-value' pairs from the total sample space; calculating a remainder value; calculating a representative value; and creating a data structure, such as an object, encapsulating the "M" name-value pairs (including the "M" name-value pairs), the remainder value, and the representative value.

FIG. 1 is a block diagram of an OSS system 100 upon which described embodiments of the present invention may be practiced. More specifically, the OSS system 100 is based upon the commercially available AGILENT QOS MANAGER OSS 5.5.0 (referred to hereinafter as the AGILENT system). General operation of the AGILENT system is presented in the AGILENT OSS QOS MANAGER 5.5.0 CONCEPTS GUIDE (part number 5188-3724, published July 2004) incorporated herein by reference. It is to be recognized that the OSS system 100 is but one example of an OSS upon which the present invention may be implemented. Further, while the following description will adopt the nomenclature of the AGILENT system, this in no way is intended to limit the present invention to the AGILENT system, rather the present invention is system independent.

The core of the OSS 100 is one or more diagnostic measurement servers (DMS) 102. The primary function of the DMS 102 is to manage and analyze data collected by agents 104n. Some of the typical functions of the DMS 102, include: storing and maintaining all measurement data; calculating baseline and thresholds; determining the health of elements of the system under test; implementing actions when a threshold is exceeded or a health state changes; and configuring agents.

The agents 104n are responsible for running tests, collecting measurements and forwarding measurement data to the DMS 102. Typically, at least one agent 104n is installed on the DMS 102. Other agents 104n may be installed on elements of the system under test, such as an FTP server 106, and SMTP server 108, and a HTML server 110. Agents 104n run independently from the DMS 102, in other words the availability of the DMS 102 does not affect the operation of the Agents 104n. Agents 104n are configured to interact with the elements they are to measure, for example agent 104b will use simple mail transfer protocol to communicate with SMTP server 108.

In accordance with at least one embodiment of the present invention, agents 104n are configured to generate measurements that comprise a collection of name-value pairs collected during a measurement interval. The name is typically an arbitrary string that provides some information regarding the data, such as a description or time and/or location where the data was obtained. The value is typically a scalar value. For example, the value may comprise an elapsed time or a number quantifying an amount that some activity has occurred (e.g. handshakes, failed connections, etc . . . ). In one embodiment, the collection of name-value pairs is encapsulated in an object, however those of ordinary skill in the art will recognize that other data structures may be utilized.

The DMS 102 utilizes the service model 114 to identify elements of the system under test. The service model 114 integrates elements of the system under test into a hierarchical tree structure that permits the visualization of elements and their interdependencies. The service model is more fully explained in U.S. Pat. No. 6,336,138, entitled Template-Driven Approach For Generating Models of Network Services, issued Jan. 1, 2002 and incorporated herein by reference. The DMS 102 stores information, including name-value pairs, in at least one database, such as the database 112. The database could, for example, comprise an ORACLE database.

Graphical user interfaces 116n interact with the DMS 102 to provide a user with displays that facilitate interaction with the DMS 102 and agents 104n. Functions of the user interface include building and managing the service model 114; defining thresholds; defining event triggers; viewing events, and viewing graphs, reports, and service level compliance agreements.

Figure 2:
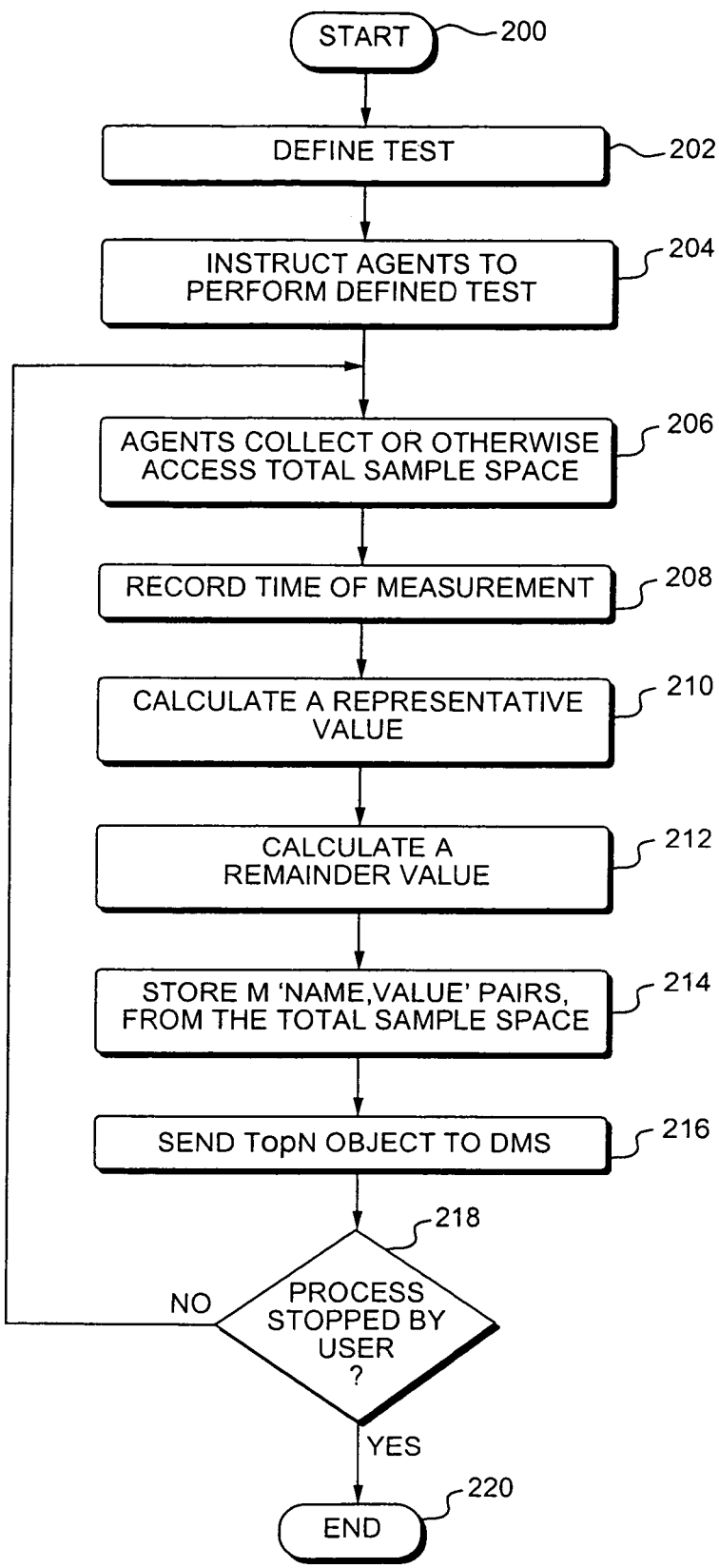
FIG. 2 is a flow chart of a method in accordance with an embodiment of the present invention.

FIG. 2 is a flow chart of a method in accordance with at least one embodiment of the present invention. More specifically, the embodiment shown in FIG. 2 is a method for forming a data structure containing a collection of name-value pairs. While other data structures may be utilized, the following discussion will adopt nomenclature associated with objects. The method shown in FIG. 2 produces an object, termed herein as a TopN object, containing a data set representative of the entire sample space. The term TopN generally refers to the concept that when a display is created only a user selected "N" (wherein "N"≦"M") name-value pairs will be individually shown. The data set generally comprises "M" name-value pairs, a representative value and a remainder value.

Table 1 illustrates several TopN measurements that may be utilized in accordance with embodiments of the present invention.

TABLE 1

| Service | Example TopN Measurements |
| --- | --- |
| Web Service | Total Http Response Time |
| Time Service | Total Ntp Response Time |
| News Service | Total Nntp Response Time |
| Email Service | Total Send Response Time |
| Email Service | Total Receive Response Time |
| Email Service | Max Round TripTime |
| Network Services | SA-Agent- Icmp Echo Response Time |
| Network Services | SA-Agent- Udp Echo Response Time |
| Network Services | SA-Agent- Tcp Connect Time |
| Network Services | SA-Agent- Dns Response Time |
| Network Services | SA-Agent- Dhcp Response Time |
| Network Services | SA-Agent- Total Http Response Time |
| Network Services | SA-Agent- Total Ftp Response Time |
| Network Services | SA-Agent- Src-to-Dest Absolute Jitter |
| Network Services | SA-Agent- Dest-to-Src Absolute Jitter |
| Network Services | Icmp- Avg. Delay |
| Network Services | Thruput- Packet Loss |
| Naming Service | Dns Cache Lookup Time |
| Naming Service | Dns Uncached Lookup Time |
| Database Service | Total DB Response Time |
| File Transfer Service | Total Ftp Response Time |
| File Transfer Service | Ftp Put Rate |
| File Transfer Service | Ftp Get Rate |
| Security service | Radius Authentication Time |

The method starts in step 200. In step 202, a test to be conducted by an agent 104n is defined. Typically, a user defines the test using a GUI 116n. A test definition generally comprises indications of: 1) what to sample; 2) how often to sample; 3) an identification of the number of name value-pairs ("M") to be stored with the data structure; and 4) an algorithm to select a representative value and a remainder value.

"What to sample," also termed the "source," generally comprises some service, or element(s) contributing to the service, mapped in the service model 114. However, the source could also be databases, such as the database 112, that contain data or information regarding the system under test. It is also possible that the source is another process that mines for information. For example a process could be designed to monitor a variety of systems for error conditions and summarize the occurrences of enumerated errors for each user.

"How often to sample" may include a frequency, termed the "measurement frequency," for example 5 minutes. In this case the test would sample data from the source at five-minute intervals. Generally, a TopN object would be formed for each data sample interval.

In accordance with at least one embodiment of the present invention "M" name-value pairs are selected from the total sample space and stored in the TopN object. The "M" name-value pairs are typically selected to be the "top" name-value pairs. The determination of the top "M" name-value pairs may be done in real time or off-line using a stored version of the sample space. Because of the volume of data for many name-value pairs, real time may be the only option. The term 'top "M" name-value pairs' can take on any definition required, but generally refers to the name-value pairs in which the value is among the $M^{th}$ greatest or least magnitudes of the sample space. By only storing "M" name-value pairs, storage space may be dramatically reduced providing the option of maintaining the TopN objects for periods of months or even years.

The representative value is a value representative of the values in the entire sample space. While the selection of a suitable algorithm may be automated, it may prove preferable to allow the end user to define the process for determining the representative value for each object. For example, in some situations an average of the values in the TopN set may prove to be a preferable representative value, while in other situations the maximum or minimum value in the TopN set may prove preferable. In yet other situations, other methods may prove beneficial, such as the median or standard deviation of the values in the total sample space. The calculation of a representative value provides a number of benefits, including the ability to process TopN objects using any function available to other measurement types, such as thresholding, generation of baselines, aggregation and intervalization.

The remainder value is a single numeric value representing the samples in the total sample space that that are not stored in the group of "M" name-value pairs. The remainder value may, but not necessarily, be calculated using the same method that is used to calculate the representative value. The remainder value provides a sense of scale to the TopN name-value pairs and the representative value.

Next in step 204, the appropriate agent(s) 104n are sent the test definitions. In step 206, the agents collect or otherwise access the total sample space and perform the test. In general, a single TopN object is produced for each measurement frequency. However, depending on the nature of the test, it is possible to produce a single object for the entire test or even some multiple of intervals. It is to be noted that even simple tests may produce an object containing several thousand name-value pairs for each measurement frequency. Next in step 208, the TopN object is time stamped. Thereafter in step 210, a representative value for the entire test space is calculated in accordance with a method selected in step 204. Next in step 212, a remainder value is calculated in accordance with a method selected in step 204.

In step 214, the top "M" name-value pairs are stored in the TopN object. Next in step 216, the TopN object is transmitted to the DMS. In step 218, a determination is made as to whether the method has been stopped by the user. If the method has not been stopped a return is made to step 206. Once the test is stopped, the method ends in step 220.

Table 2 is a representation of possible contents of a TopN object.

TABLE 2

| Representative Value | 12 |
|---|---|
| Remainder Value | 2 |
| Name | Value |
| Login Errors - Joe | 12 |
| Login Errors - Sue | 5 |

TABLE 2-continued

| Sys Errors - Sally | 2 |
|---|---|
| I/O Errors - Bill | 1 |
| Methods | |
| Get Time Stamp | |
| Get Representative Value | |
| Get Remainder Value | |
| Get Name-Value pairs | |
| Get Ordered Name-Value Pairs | |
| Get Other Value | |
| Intervalize | |

The TopN object shown in Table 2 starts with the representative value and the remainder value. It is to be noted that while the remainder should be calculated during the formation of the TopN object, depending on the selected method, the representative value need not be calculated and need not even be stored with the TopN object, so long as the number of name-value pairs is known (can be stored as part of the TopN object). Following the representative and remainder values is the "M" name value pairs. As noted the name can be any arbitrary text string while the value is typically a scalar value. Following is a set of methods provided by the TopN object.

Table 3 contains a segment of self-documented JAVA code describing the interface to the methods set forth in Table 2.

TABLE 3

```
public interface FhTopN {
    /**
     *
     * @return timestamp in seconds since the epoch
     */
    public abstract int getTimestamp( );
    /**
     *
     * @return representitive value of this topn object
     */
    public abstract float getRepValue( );
    /**
     *
     * @return Map accessed by String component_name to retrieve
     * Float value. For aggregate TopN measurements, the
     component_name is the
     * fullname string of the source TopN measurement.
     */
    public abstract Map getComponents( );
    /**
     * Return the set of components in the order that they should
     be displayed
     * @param algorithm Intervalization algorithm. This should be
     the
     * algorithm that the topn object was intervalized with which
     is contained
     * in the interval wrapper, FhTopNInterval getAlgorithm( ).
     * @return An ArrayList where each element is an Object[2]
     where
     * Object[0] is a String name, and Object[1] is a Float value.
     */
    public abstract List getOrderedComponents(int algorithm);
    /**
     *
     * @return the remainder value.
     */
    public abstract float getRemainder( );
    /**
     * @param index Where to start calculating other value.
     * @param algorithm Intervalization algorithm. This should be
     the
     * algorithm that the topn object was intervalized with which
     is contained
     * in the interval wrapper, FhTopNInterval getAlgorithm( ).
     * @return A value that is calculated from all components
     from
```

TABLE 3-continued

```
 * the getOrderedComponents ArrayList that start at index.
 This value
 * can will include the remainder.
 */
public abstract float getOtherValue(int index, int algorithm);
/**
 * @param exclude_names List of names for components that
 are not to be
 * included in the other value calculation.
 * @param algorithm Intervalization algorithm. This should be
 the
 * algorithm that the topn object was intervalized with which
 is contained
 * in the interval wrapper, FhTopNInterval getAlgorithm( ).
 * @return A value this is calculated from all components from
 the
 * getOrdereComponents ArrayList that is not included in the
 exclude_names
 * list. This value will also include the remainder.
 */
public abstract float getOtherValue(List exclude_names, int
algorithm);
/**
 * Create an intervalized array of TopN objects.
 * @param topn Source array of objects in timestamp order to
 intervalize.
 * @param start Beginning of requested historical timespan in
 seconds since
 * the epoch inclusive
 * @param end End of requested historical timespan in seconds
 since the
 * epoch exclusive
 * @param size Size of requested intervals in seconds
 * @param algorithm Algorithm to use. These are suggestions
 and may not
 * be applicable to all topn objects.
 * @return array of TopNInterval objects in timestamp order
 intervalized to size
 */
public abstract FhTopNInterval[] intervalize(FhTopNInterval[]
        topn, int start, int end, int size, int algorithm);
public static final int DEFAULT_INTERVALIZATION_ALG = 0;
public static final int AVG_INTERVALIZATION_ALG = 1;
public static final int MIN_INTERVALIZATION_ALG = 2;
public static final int MAX_INTERVALIZATION_ALG = 3;
public static final int SUM_INTERVALIZATION_ALG = 4;
/**
 * @return The localized label for remainder in topn graphs.
 */
public abstract String getRemainderLabel( );
}
/**
 *
 * @return this topn object stringified for use in public
 exporting and
 * logging
 */
public abstract String toString( );
```

Figure 3:
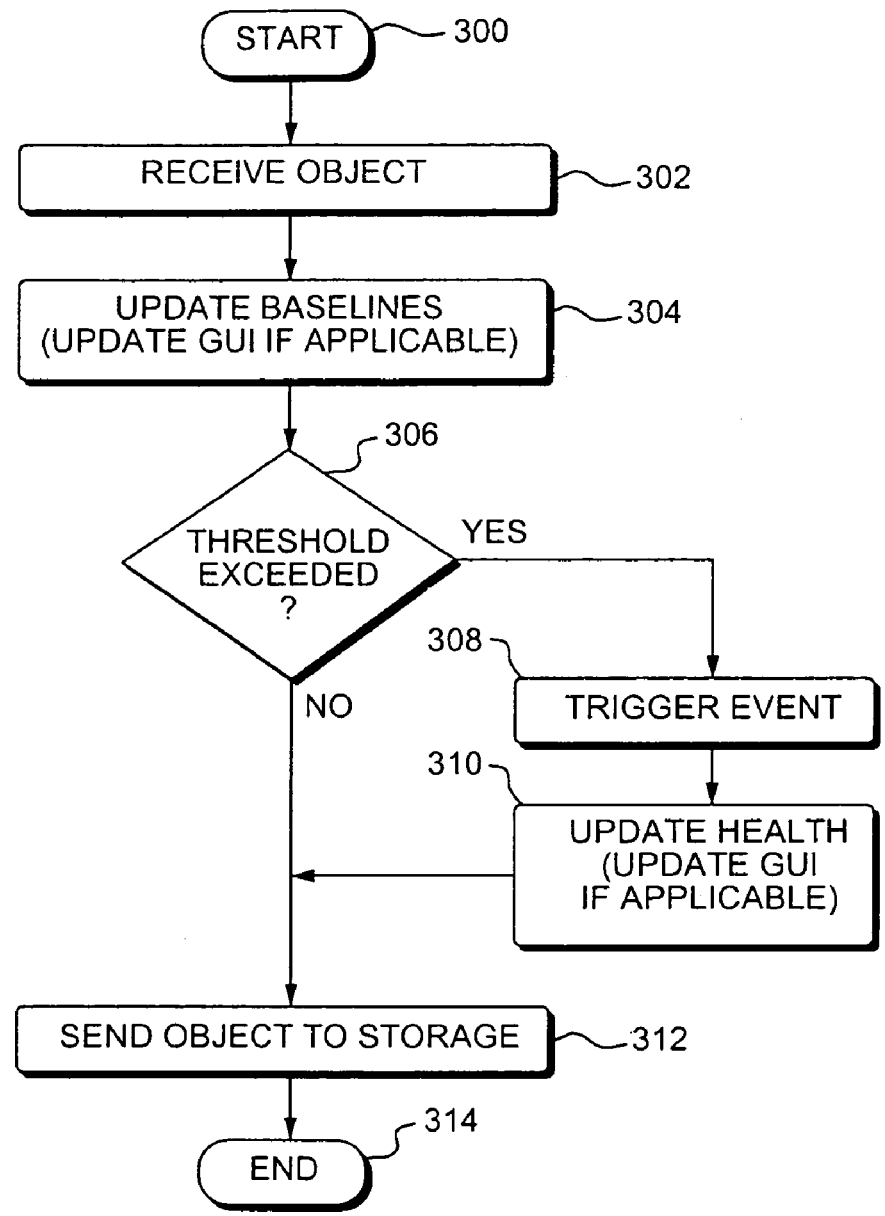
FIG. 3 is a flow chart of a method in accordance with an embodiment of the present invention.

FIG. 3 is a flow chart of a method in accordance with an embodiment of the present invention. More specifically FIG. 3 illustrates a method that may be utilized by a DMS (such as the DMS 102) to process TopN Objects received from agent(s) 104n. One benefit of embodiments of the present invention is the limited amount of code changes necessary to existing DMSs and agents to allow them to handle TopN objects. By utilizing the representative value associated with the TopN object as scalar value, existing processes such as graphing, thresholding and baselining may be performed on TopN objects without significant modification of existing processes.

The method starts in step 300. In step 302, the DMS receives a TopN object from an agent. Next in step 304, the DMS updates baselines defined for the test that produced TopN object. The baseline may be updated using representative value, permitting the use of existing baselining methods. The DMS may also push an update to any GUI that currently has a display associated with the baseline.

Next in step 306, a determination is made as to whether the representative value has exceeded a preset threshold. If a threshold has been exceeded, the method proceeds to step 308, otherwise the method proceeds to step 312. In step 308 an event is triggered. Next, the health state of the appropriate elements in the service model is updated in step 310. The DMS may also push an update to any GUI that currently has a display associated with the health state. Thereafter, the method goes to step 312. In step 312, the TopN object is sent to storage, such as the database 112. The method then ends in step 314.

One benefit of certain embodiments of the present invention is the formation of values representative of the data space summarized by the TopN object, such as the representative value and the remainder. A third value that may prove useful is the "other" value. As used herein the "other" value refers to a value representative of values in the sample space but not included in the displayed values (usually the top "N"). Table 4 provides a summary of the relationship among the various values discussed herein.

TABLE 4

| SAMPLE SPACE | |
|---|---|
| (Used to Calculate the Representative Value) | |
| "M" | Remainder |
| (# of stored name-value pairs) | (representative of values in sample space outside of "M") |
| "N" | Other |
| (user selected name-value pairs to individually display) | (representative of values in the sample space other than those in the "M" pairs) |

The calculation of representative value, remainder value, and other value facilitates the use of existing OSS functionality to analyze and react to TopN objects. In many cases, representative values are simply passed to existing routines for processing as if they were otherwise normal measurements. The other value may be display in association with the top "M" name-value pairs to provide a sense of scale. In many situations, even where the sample space includes thousands of name-value pairs, a small number of name-value pairs (for example 3 or 5) will have a value significantly outside the remaining values. By displaying a representation of the other value, users can discern whether they have selected an appropriate value for "N," i.e. that they are viewing those name-value pairs most deserving of consideration.

Once a TopN object has been formed, additional operations such as aggregation and intervalization may be undertaken.

Aggregation is the creation a single TopN measurement object representing a series of TopN measurement objects. In general this involves populating the aggregate object with name-value pairs with the object names and representative value from each of the objects being aggregated. The representative and remainder values would be calculated based on a selected algorithm. For example, TABLE 5 represents four objects being aggregated and TABLE 6 represents the aggregated object wherein the representative value is calculated by selecting the maximum value from the name-value pairs.

TABLE 5

| Object1 | |
|---|---|
| Representative | 0.7 |
| Bad Cheese | 3 |

TABLE 5-continued

|  |  |
|---|---|
| Bad Bagel | 2 |
| Bad Coffee | 2 |
| Remainder | 2 |
| Object2 | |
| Representative | 0.6 |
| Bad Tea | 2 |
| Bad Bagel | 1 |
| Remainder | 2 |
| Object 3 | |
| Representative | 0.5 |
| Bad Donuts | 7 |
| Bad Tea | 3 |
| Remainder | 10 |
| Object 4 | |
| Representative | 0.75 |
| Bad Cheese | 9 |
| Bad Bagels | 4 |
| Bad Scones | 2 |
| Remainder | 5 |

TABLE 6

Aggregate Object

| | |
|---|---|
| Representative value | 0.75 |
| Object4 | 0.75 |
| Object1 | 0.7 |
| Object2 | 0.6 |
| Object3 | 0.5 |
| Remainder | (None) |

Intervalization is the creation of a single TopN measurement object from a set of TopN objects. However, in intervalization, the name-value pairs are preserved and combined using the TopN algorithm. This facilitates the displaying of data using different measurement intervals, for example taking 3 five minute TopN objects and creating a single 15 minute TopN object. TABLES 7 and 8 illustrate intervalization. In this case Object1 and Object2 represents 10 samples while Object3 represents 20 samples. The objects are designed to capture the error rate, e.g. the number of bad items in the sample space. The representative values can be thought of as an error rate. Using object 1 as an example, the representative value is calculated by dividing 7 (the total number of bad items (errors)) by 10 (the total sample space). The representative value of the new object is calculated by averaging the representative values of the individual objects weighting based on the number of samples in each object.

TABLE 7

Object1

| | |
|---|---|
| Representative Value | 0.7 |
| Bad Cheese | 3 |
| Bad Bagels | 2 |
| Bad Coffee | 2 |
| Remainder | 0 |
| Object2 | |
| Representative Value | 0.9 |
| Bad Tea | 5 |
| Bad Bagels | 4 |
| Remainder | 0 |
| Object3 | |
| Representative Value | 0.6 |
| Bad Donuts | 7 |
| Bad Tea | 3 |

TABLE 7-continued

| | |
|---|---|
| Bad Scones | 2 |
| Remainder | 0 |

TABLE 8

Intervalized Object

| | |
|---|---|
| Representative Value | 0.7 |
| Bad Tea | 8 |
| Bad Donuts | 7 |
| Bad Bagels | 6 |
| Bad Cheese | 3 |
| Bad Coffee | 2 |
| Bad Scones | 2 |
| Remainder | (none) |

Once TopN objects have been formed (and possible aggregated and intervalized), displays may be created to provide the user with useful information based on the name-value pairs and data contained in the objects. FIGS. 4 through 7 contain example of displays that may be presented using TopN data formed in accordance with the method shown in FIG. 2. FIGS. 4 through 8 were generated using AGILENT'S QOS MANAGER, however those of ordinary skill in the art will recognize the applicability of embodiments of the present invention to other measurement systems, including many if not all competing OSSs.

Figure 4:
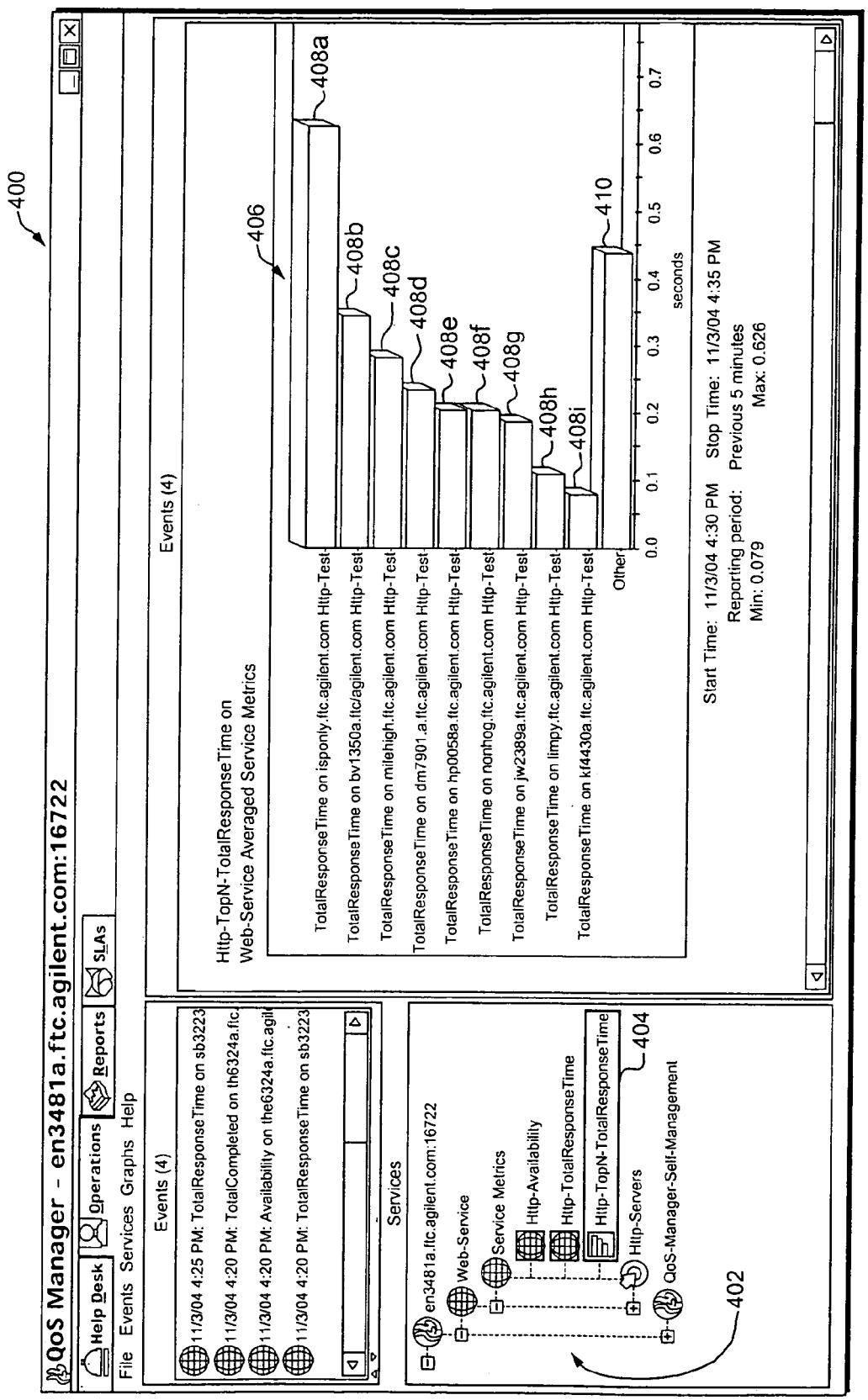
FIG. 4 is a representation of a screen displaying a graph in accordance with an embodiment of the present invention.

FIG. 4 is a representation of a screen 400 displaying a graph 406 in accordance with an embodiment of the present invention. In FIG. 4, the user has selected a TopN Aggregate measurement node 404 in the Services View 402 that has resulted in a graph 406 of the name-value pairs of a TopN measurement object. The graph 406 is one of a variety of possible graph types suitable for the display of TopN data. More specifically, the graph 406 is a histogram graph, of 'name-value' pairs stored in the TopN Measurement object. The user may select the number (i.e. the "N") of pairs to be displayed. Bars 408a through 408i provide the total response time for Http servers exhibiting the top response times (in this case translating into the worst performance). Bar 410 corresponds to an "other" value that represents the response times in the total sample space but not shown individually in the display. The other value may be calculated based on the same algorithm as the representative value. In FIG. 4, the other value represents the sum of the response times in the total sample space but not shown individually in the display.

Figure 5:
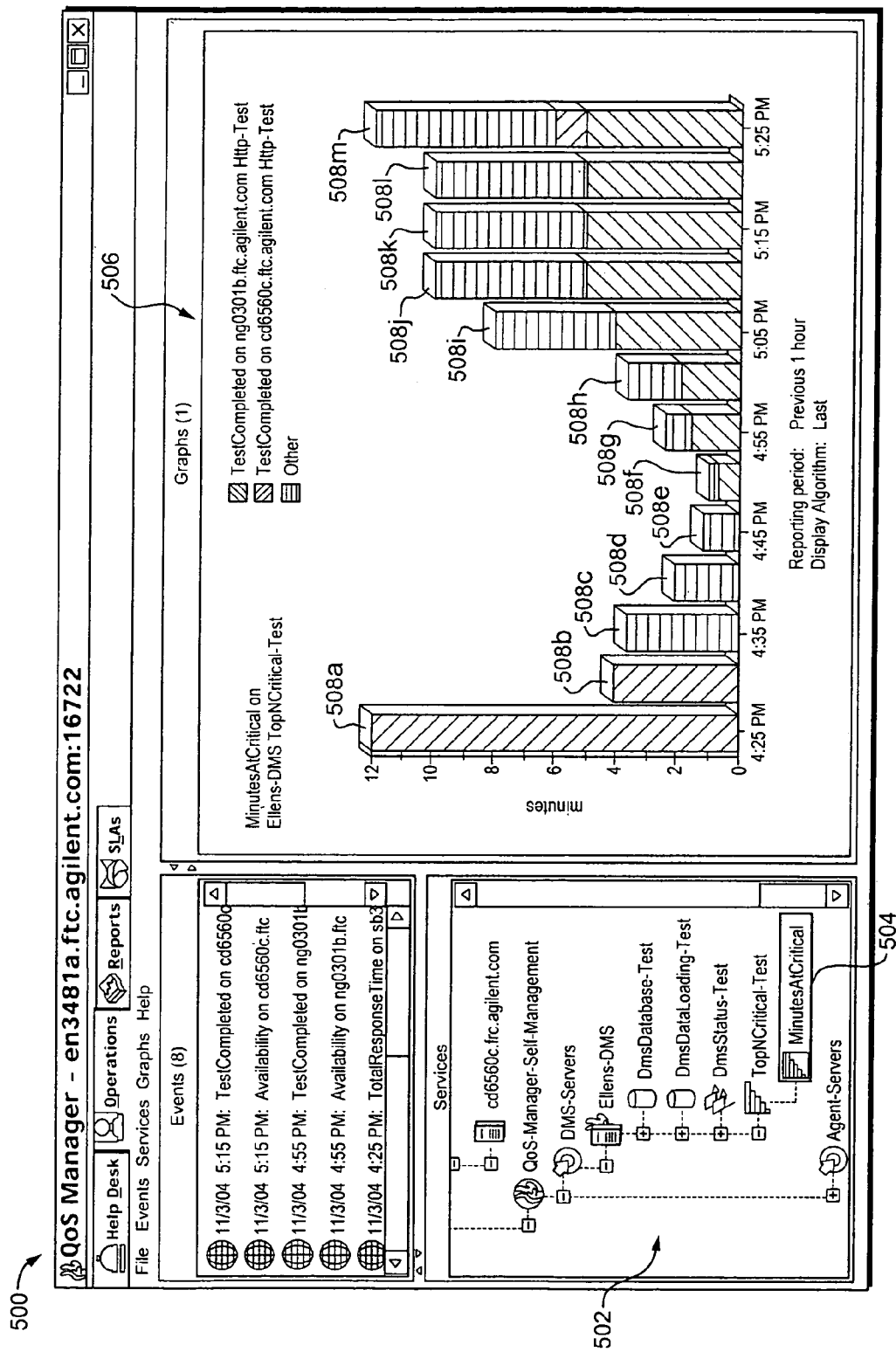
FIG. 5 is a representation of a screen displaying a graph in accordance with an embodiment of the present invention.

FIG. 5 is a representation of a screen 500 displaying a graph 506 in accordance with an embodiment of the present invention. In FIG. 5, the user has selected a TopN measurement node 504 in the Services View 502 that has resulted in a graph 506 of multiple TopN measurement objects. Each bar 508n represents the 'name-value' pairs in a single TopN measurement object. The graph 506 is a time series graph, of the 'name-value' pairs displayed as stacked bar for each time point in the graph. To reduce clutter, the selection method may be employed to limit the number of name-value pairs shown across the graph. In this case, the user has requested a selection method that selects the top two (e.g. N=2) servers (e.g. the two servers exhibiting the worst response) from the last time interval. For each of the preceding intervals, the values corresponding to the two identified servers (as described by the "name" of the name-value pair) are selected for display—irregardless of whether they are in the top "M" for that interval. In this case the display interval for the name-value pairs was five minutes, giving 13 bars total.

The selection method to choose which name-value pairs to display from the various objects may be customized either by the user or the programmer. Other selection methods may be utilized with respect to the graph shown in FIG. 5. For example, the top "M" from the first object could be selected. Alternatively, the top "M" from each object can be selected and either displayed as a group for each bar in the graph, or just in the pertinent object's bar. The top "M" from the object having the largest or smallest representative value is yet another selection mechanism. Yet another example of a selection mechanism would be to sum each of the values for each server over the requested time period and select the servers with the top or bottom "M" sum (more or less integrating the times for each server over the displayed period). Other selection methods may be used and the present invention is not limited to the enumerated methods.

Figure 6:
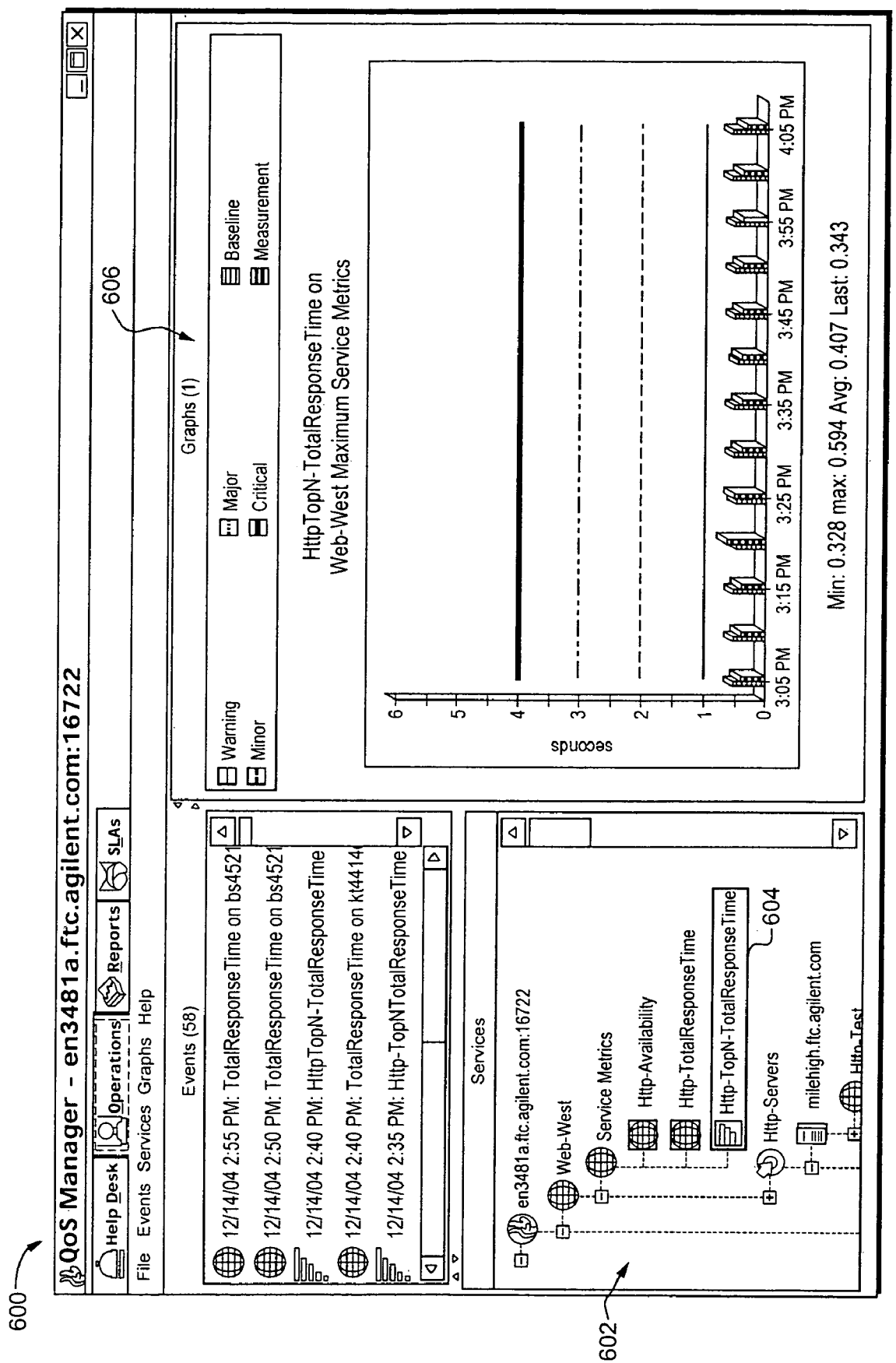
FIG. 6 is a representation of a screen displaying a graph in accordance with an embodiment of the present invention.

FIG. 6 is a representation of a screen 600 displaying a graph 606 in accordance with an embodiment of the present invention. In FIG. 6, the user has selected a TopN measurement node 604 in the Services View 602 that has resulted in a graph 606. The TopN Measurement has been displayed as a Measurement graph by displaying the TopN Measurement's representative value over the time period. By using a single numeric value to represent the TopN measurement objects, complex objects may be processed as if they were simple numeric data. This allows the use of current services provided by the OSS, for example, baselining and thresholding—both of which are illustrated in FIG. 6. In FIG. 6, Warning, Minor, Major, and Critical thresholds are shown on the graph. Baseline calculations are also displayed as bars next to each representative value (value on the right, baseline on the left).

Figure 7:
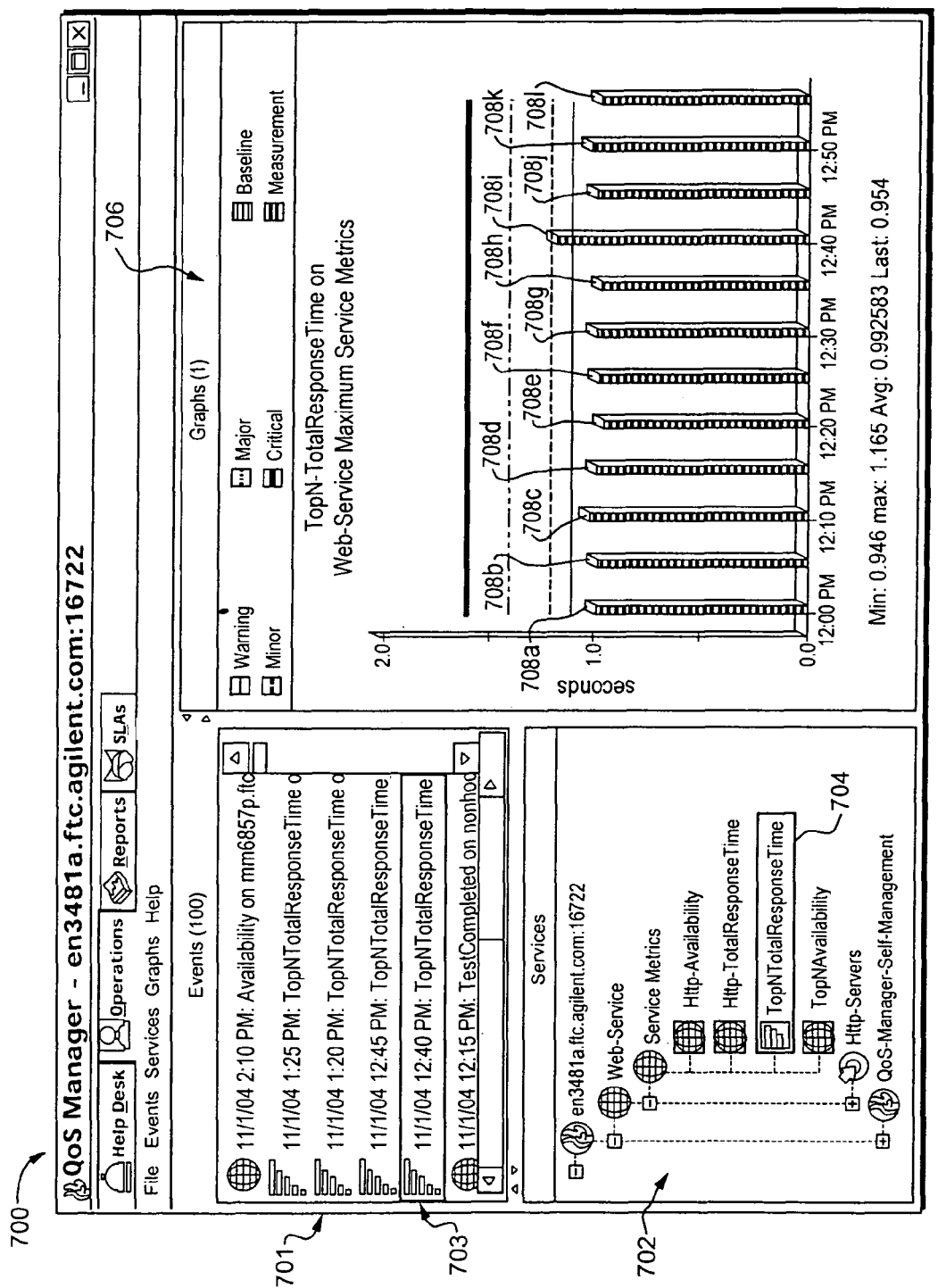
FIG. 7 is a representation of a screen displaying a graph in accordance with an embodiment of the present invention.

FIG. 7 is a representation of a screen 700 displaying a graph 706 in accordance with an embodiment of the present invention. In FIG. 7, the user has selected an event 703 in an events view 701 that has caused the appropriate measurement node 704 to be selected in the services view 702. This in turn has caused a graph 706 of the values during the time period in which the event occurred to be displayed. The graph 706 is a typical Measurement graph, of discrete values over a time period. As with FIG. 6, the representative values of the various TopN objects are used to create the measurement graph 706. In most OSS systems, such as the AGILENT QOS MANAGER, events are generated when a value (in this case the representative value) exceeds a threshold value for that value.

Although some embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of operating a computer system to characterize a network, said computer system comprising a central computer and a plurality of agents that make measurements of transactions that take place on said network, each agent operating independently of others of said agents, said method comprising:
   causing each agent to make a series of measurements over a measurement time period and to store a first subset of said measurements made during said time period, wherein the first subset consists of M measurements wherein M is greater than 1,
   wherein each measurement is related to said network, and wherein each measurement in the first subset is stored as a name-value pair, and
   wherein each agent compares each measurement made by that agent with a predetermined criterion to determine if that measurement is to replace one of said stored measurements;
   causing each agent to calculate a remainder value that is determined by said measurements made during said measurement time period that are not included in the first subset of measurements; and,
   causing each agent to transmit said first subset of measurements and said reminder value to said central computer.

2. A method, as set forth in claim 1 wherein said agent performs said storage and transmission of said first subset of measurements and said reminder value by storing said first subset of measurements and said reminder value in a predetermined data structure and transmitting said data structure to said central computer.

3. A method, as set forth in claim 2 wherein said central computer aggregates a plurality of said predetermined data structures to generate an aggregated data structure.

4. A method, as set forth in claim 1 further comprising:
   causing each agent to calculate a representative value that is determined by all of said measurements made during said time period, and to transmit said representative value to the central computer.

5. A method, as set forth in claim 1, wherein said subset is determined either by selecting only M name-value pairs with M largest values measured in said time period or by selecting only M name-value pairs with M smallest values measured in said time period.

6. A method, as set forth in claim 4, wherein said representative value is selected from the group comprising: a largest value measured in said time period, a smallest value measured in said time period, an average of the values measured in said time period, and a sum of all the values measured in said time period.

7. A method, as set forth in claim 1, further comprising: displaying a graphic based on a subset of said first subset of measurements.

8. A method, as set forth in claim 2 wherein said central computer intervalizes a plurality of said predetermined data structures to generate an intervalized data structure.

9. A method, as set forth in claim 1, wherein the remainder value is selected from the group comprising: a largest of the-values measured in said time period not included in said first subset; a smallest of the values measured in said time period not included in said first subset; an average of the values measured in said time period not included in said first subset; and a sum of the values measured in said time period not included in said first subset.

10. A method, as set forth in claim 1, further comprising:
    creating a bar graph having at least one segmented bar with N segments representing top N values of said first subset of measurements, wherein N is less or equal to M, and at least one segment representing a first other value determined by all the measurements made during said time period other than those having the top "M" values.

11. A method, as set forth in claim 10, further comprising:
    causing each agent to make a second series of measurements over a second time period and to store a second subset of said second series of measurements, wherein the second subset consists of M measurements,
    wherein each measurement is related to said network and is characterized by a name-value pair; and
    causing each agent to calculate a second other value determined by all the measurements made during said second time period other than those included in the second subset; and wherein the step of creating a bar graph comprises creating a bar graph having at least two segmented bars with the first segmented bar representing N name-value pairs having the top N values measured in said first time period and the first other value and the second segmented bar representing N name-value pairs having the top N values measured in said second time period and the second other value, wherein N is less or equal to M.

12. An OSS system comprising a computer system running one or more software programs, said computer system comprising: a central computer and a plurality of agents that make measurements of transactions that take place on said network, each agent operating independently of others of said agents and independently of said central computer, wherein each agent makes a series of measurements over a time period, and forms a predetermined data structure, said data structure comprising a subset of M said measurements wherein M>1, a representative value that is determined by all of said measurements made during said time period, and a remainder value that is determined by all of said measurements other than those in said subset, wherein each measurement is related to said network and is characterized by a name-value pair, and wherein each agent compares each measurement made by that agent with a predetermined criterion to determine if that measurement is to replace one of said measurements in said data structure.

13. An OSS system, as set forth in claim 12, further comprising: a database system in which said central computer stores the data structures created by the agents.

14. An OSS system, as set forth in claim 12, further comprising: a graphical user interface adapted to generate graphics based on the data structures formed by the agents.

15. An OSS system, as set forth in claim 14, wherein the graphical user interface generates a bar graph display with a single bar for each representative value of each data structure.

16. An OSS system, as set forth in claim 14, wherein the graphical user interface generates a bar graph for a single object data structure with a bar for each name-value pair of a subset of said predetermined subset of said measurements in said data structure, said subset including only N name-value pairs with N top values, wherein N≦M.

17. An OSS system, as set forth in claim 16, wherein the bar graph includes a bar representative of all the values of the name-value pairs of measurements made during said time period other than those with the N top values.

18. A method of operating a computer system to characterize a network, said computer system comprising a central computer and at least one agent for making measurements of transactions that take place on said network, said method comprising:

a) causing the agent to make a series of measurements over a pre-determined time period, wherein each measurement is characterized by a name-value pair comprising a name and a value;

b) causing the agent to select top M measurements from the first series of measurements, wherein M is greater than 1 and is smaller than a total number of the measurements made by the agent during said time period, wherein the top M measurements are characterized by M name-value pairs having M largest values or M smallest values among all said measurements performed during said time period;

c) causing the agent to calculate a remainder value that is determined by all said measurements made during said time period excluding the top M measurements;

d) causing the agent to transmit to the central computer the M name-value pairs corresponding to the top M measurements and the reminder value, while not transmitting to the central computer all the measurements made during the time interval that are not included in the top M measurements; and, e) storing, at the central computer, a top-M data structure comprising the M name-value pairs received from the agent and the reminder value received from the agent for said time period.

19. The method of claim 18, comprising:

causing the agent to repeat steps (a)-(e) for a plurality of successive time periods, storing for each of the time periods a separate top-M data structure at the central computer to obtain a plurality of time-stamped top-M data structures; and, forming, at the central computer, a new top-M data structure from the plurality of time-stamped top-M data structures, the new top-M data structure comprising a plurality of name-value pairs, and at least one of: a new reminder value and a representative value.

* * * * *

UNITED STATES PATENT AND TRADEMARK OFFICE
CERTIFICATE OF CORRECTION

| | | |
|---|---|---|
| PATENT NO. | : 8,108,510 B2 | Page 1 of 1 |
| APPLICATION NO. | : 11/045819 | |
| DATED | : January 31, 2012 | |
| INVENTOR(S) | : Nelson et al. | |

It is certified that error appears in the above-identified patent and that said Letters Patent is hereby corrected as shown below:

Col. 13, line 43, "$N \leqq M$" should read -- $N \leq M$ --

Signed and Sealed this
Fourth Day of December, 2012

David J. Kappos
*Director of the United States Patent and Trademark Office*